US008748335B2

(12) United States Patent
Zhou et al.

(10) Patent No.: US 8,748,335 B2
(45) Date of Patent: Jun. 10, 2014

(54) PHOTODEGRADATION CATALYST AND PHOTODEGRADATION CATALYST PRECURSOR COMPRISING METAL HALIDE OR METAL OXYHALIDE

(75) Inventors: Xiao Ping Zhou, Changsha (CN); Fei Chen, Huzhou (CN); Jeff Qiang Xu, Sugar Land, TX (US)

(73) Assignee: Microvast, Inc., Stafford, TX (US)

( * ) Notice: Subject to any disclaimer, the term of this patent is extended or adjusted under 35 U.S.C. 154(b) by 1070 days.

(21) Appl. No.: 12/602,653

(22) PCT Filed: Jun. 1, 2007

(86) PCT No.: PCT/CN2007/001753
§ 371 (c)(1),
(2), (4) Date: Dec. 1, 2009

(87) PCT Pub. No.: WO2008/144963
PCT Pub. Date: Dec. 4, 2008

(65) Prior Publication Data
US 2010/0200392 A1 Aug. 12, 2010

(51) Int. Cl.
*B01J 31/00* (2006.01)
(52) U.S. Cl.
USPC ........... 502/102; 502/104; 502/349; 502/350; 502/300; 423/245.3
(58) Field of Classification Search
USPC .................................. 502/102, 104
See application file for complete search history.

(56) References Cited

U.S. PATENT DOCUMENTS

2005/0159306 A1* 7/2005 Kezuka et al. ................ 502/350

FOREIGN PATENT DOCUMENTS

| CN | 1833773 | 9/2006 |
| CN | 1935362 | 3/2007 |
| CN | 1935371 | 3/2007 |

OTHER PUBLICATIONS

Hamal et al., "Synthesis, characterization, and visible light activity of new nanoparticle photocatalysts based on silver, carbon, and sulfur-doped TiO2," 2007, Journal of Colloid and Interface Science, 311, pp. 514-522.*

* cited by examiner

*Primary Examiner* — Melissa Stalder
(74) *Attorney, Agent, or Firm* — Baker & McKenzie LLP

(57) ABSTRACT

A photodegradation catalyst or a photodegradation catalyst precursor comprises a plurality of domains of an oxide of a first metal distributed in a substrate of a halide or oxyhalide of a second metal, wherein the mole percentage of the halide or oxyhalide of the second metal is above 50%. Additionally, a method of preparing a photodegradation catalyst or a photodegradation catalyst precursor, a photodegradation catalyst or a photodegradation catalyst precursor obtained from the method and a method of treating organic pollutants or substances in air or water by using the photodegradation catalyst or the photodegradation catalyst precursor are illustrated.

29 Claims, 3 Drawing Sheets

PHOTODEGRADATION CATALYST AND PHOTODEGRADATION CATALYST PRECURSOR COMPRISING METAL HALIDE OR METAL OXYHALIDE

CROSS-REFERENCE TO RELATED APPLICATIONS

This application is a 35 U.S.C. Section 371 of PCT/CN2007/001753 filed Jun. 1, 2007, which is incorporated herein by reference in its entirety.

FEDERALLY SPONSORED RESEARCH STATEMENT

Not applicable.

REFERENCE TO MICROFICHE APPENDIX

Not applicable.

FIELD OF THE INVENTION

Embodiments of the invention are generally related to the field of photodegradation catalysts or photodegradation catalyst precursors, methods of preparing photodegradation catalysts or catalyst precursors, and their uses in photodegradation of organic substances.

BACKGROUND OF THE INVENTION

Metal oxide semiconductor materials have been extensively investigated as photocatalysts for photodegradation of organic pollutants in water and air. Most of these investigations have focused on $TiO_2$ and $TiO_2$ catalysts doped with other metal ions and sometimes anions. Generally, such photodegradation catalysts are susceptible to limited photon efficiencies due to recombination of electron-hole pairs, therefore reducing the overall photon efficiencies of the catalysts. One measure of a catalyst's usefulness, however, is its efficiency. Thus, the relatively low efficiency of such oxide-based photocatalyst composition represents a limitation on their commercial viability. Accordingly, there is a need for a high-efficiency photodegradation catalyst or photodegradation catalyst precursor that has an improved control over the recombination of electron-hole pairs.

BRIEF DESCRIPTION OF EMBODIMENTS OF THE INVENTION

According to one aspect of the current invention, there is provided a photodegradation catalyst or a photodegradation catalyst precursor comprising a plurality of domains of an oxide of a first metal distributed in a substrate of a halide or oxyhalide of a second metal, wherein the mole percentage of the halide or oxyhalide of the second metal is above 50%.

According to another aspect of the current invention, there is provided a method of making a photodegradation catalyst or a photodegradation catalyst precursor. Embodiments of the methods described herein include:

a) combining a first metal-containing composition, a second metal-containing composition, and a halogenating compound in the presence of a solvent to provide an intermediate composition, wherein the mole percentage of the second metal element in the total amount of the first and the second metal elements is at least 50%, and at least one of the first- or second-metal containing compositions is a metal oxide, a salt of a metal oxide, or a metal containing salt;

b) removing the solvent from the intermediate composition to provide a dried intermediate composition;

c) calcining the dried intermediate composition to produce the photodegradation catalyst or the photodegradation catalyst precursor.

A further aspect of the current invention is directed to a photodegradation catalyst or a photodegradation catalyst precursor prepared by the method disclosed herein.

An even further aspect of the current invention is directed to a method of photodegradating organic pollutants or substances, comprising:

i) preparing a photodegradation catalyst or a photodegradation catalyst precursor by:

a) combining a first metal-containing composition, a second metal-containing composition, and a halogenating compound in the presence of a solvent to provide an intermediate composition, wherein the mole percentage of the second metal element in the total amount of the first and the second metal elements is at least 50%, and at least one of the first- or second-metal containing compositions is a metal oxide, a salt of a metal oxide, or a metal containing salt;

b) removing the solvent from the intermediate composition to provide a dried intermediate composition;

c) calcining the dried intermediate composition to produce the photodegradation catalyst or the photodegradation catalyst precursor;

ii) contacting the photodegradation catalyst or the photodegradation catalyst precursor with organic pollutants in the presence of oxygen and light.

DETAILED DESCRIPTION OF EMBODIMENTS OF THE INVENTION

The following description illustrates embodiments of the invention by way of example and not by way of limitation. Thus, the embodiments described below represent preferred embodiments of the invention. All numbers disclosed herein are approximate values unless stated otherwise, regardless whether the word "about" or "approximately" is used in connection therewith. The numbers may vary by up to 1%, 2%, 5%, or sometimes 10 to 20%. Whenever a numerical range with a lower limit and an upper limit is disclosed, any number falling within the range is specifically and expressly disclosed.

As used herein, the term "catalyst precursor" shall mean compound(s) or composition(s) that do not initially have catalytic functionalities or have only limited catalytic functionalities, and are transformed into compound(s) or composition(s) having a significant level of catalytic functionalities by exposure to photocatalytic reaction conditions. Such compound(s) or composition(s) are often characterized as having an induction time of limited catalytic activity.

As used herein, the term halogen means an element or a mixture of elements from Group 7 of the periodic table. Halogens that are particularly suitable for the current invention include fluorine (F), chlorine (Cl), bromine (Br), iodine (I), and the mixtures thereof. More preferably, the halogen is fluorine, chlorine, bromine, or their mixtures. Most preferably, the halogen is fluorine.

Accordingly, the term halides as used herein are preferably fluorides, chlorides, bromides, iodides, and mixtures thereof. More preferably, the halides of the current invention are fluorides. With respect to oxyhalides, preferably, they are oxyfluorides, oxychlorides, oxybromides, oxyiodides, and mixtures thereof. More preferably, the oxyhalides are oxyfluorides.

The amounts referred to herein are to be determined according to the enumerated components. Other components may be present, either intentionally or as impurities. Those additional components, however, should not be included in the determination of the relative amounts of the enumerated components.

According to one aspect of the current invention, there is provided a photodegradation catalyst or a photodegradation catalyst precursor that comprises a plurality of domains of an oxide of a first metal distributed in a substrate of a halide or oxyhalide of a second metal. The mole percentage of the second metal is preferably above 50 mole percent in relation to the total amount of the first and second metals. In certain embodiments, the lower limit of the mole percent of the second metal element is about 75 mole percent, about 80 mole percent or about 90 mole percent. The upper limit of the range of the second metal element can be about 75 mole percent, about 80 mole percent, about 85 mole percent, about 90 mole percent, about 95 mole percent, or greater than about 95 mole percent. In some embodiments, the mole percentage of the second metal element ranges from about 70 mole percent to about 95 mole percent. More preferably, the second metal element comprises about 85 mole percent to about 95 mole percent. Even more preferably the second metal element comprises about 90 mole percent.

Suitable first metal for the current invention includes any transition metal or lanthanide metal or their mixtures. Transition metals selected from Groups 4-12 of the periodic table are particularly useful in some embodiments. Some such metal includes, but is not limited to, Ti, Zr, V, Nb, Ta, Cr, Mo, W, Mn, Fe, Ru, Re, Co, Ni, Zn and Cd. Exemplary lanthanide metal includes, but is not limited to, Y, La, Sm, Ce, Tb, Eu, Nd and Gd. So-called "main group" metal, such as but not limited to Ga, In, Tl, Sn, Sb, Bi and Te, may also be suitable in some embodiments.

Suitable oxides of transition metals include, but are not limited to, $TiO_2$, $ZrO_2$, $V_2O_5$, $Nb_2O_5$, $Ta_2O_5$, $Cr_2O_3$, $MoO_3$, $WO_3$, $MnO_2$, $Fe_2O_3$, $RuO_2$, $Ru_2O_3$, $RuO$, $Re_2O_7$, $Co_2O_3$, $NiO$, $ZnO$, $CdO$. Exemplary lanthanide oxides include, but are not limited to $Y_2O_3$, $La_2O_3$, $Sm_2O_3$, $CeO_2$, $TbO$, $TbO_2$, $Eu_2O_3$, $NdO$, $NdO_2$, $GdO$, $GdO_2$. Suitable "main group" metal oxides include, but are not limited to $Ga_2O_3$, $In_2O_3$, $Tl_2O_3$, $SnO_2$, $Sb_2O_3$, $Bi_2O_3$, $TeO_3$, $TeO_2$. Of course, mixtures of one or more such oxides, whether they be mixtures of individual oxide compositions (such as $V_2O_5/MoO_3$ mixtures) or solid solutions of oxides incorporating different metals (such as $Nb_xTa_{(2-x)}O_5$ and the like) may also be used.

In particular embodiments, $TiO_2$, $V_2O_5$, $Nb_2O_5$, $TbO$, $TbO_2$, $MoO_3$ or mixtures thereof are used. In some embodiments, a vanadium oxide, such as $V_2O_5$, is particularly useful. In some other embodiments, a niobium oxide, such as $Nb_2O_5$, is also useful. In some additional embodiments, oxides such as $TbO$, $TbO_2$, or the mixtures thereof are used. In some further embodiments, the a molybdenum oxide, particularly $MoO_3$, can be used.

The selected oxide component or mixture of oxide components is present with a metal halide and/or a metal oxyhalide. Suitable metal elements are referred to as "second metals" or "second metal elements" herein and include metals of Groups IA-IIIA, Lanthanides and Actinides, particularly Group 1A and Group 2A metals, Sc, Y, La, Sin, Nd, Eu, Gd, Tb, Yb and mixtures thereof. Preferably, the second metal element is selected from the group consisting of Group 1A and Group 2A metals, particularly Na, Mg, Ca, Sr, Ba and mixtures thereof, when metal halides are formed as the substrate. Sc, Y, La, Sin, Nd, Eu, Gd, Tb, Yb and mixtures thereof can be selected when oxyhalides are formed as the substrate of the catalyst or catalyst precursor.

More specific examples of the halides include, but are not limited to, $NaF$, $MgF_2$, $CaF_2$, $SrF_2$, $BaF_2$ or mixtures thereof. In some embodiments, the halide is $MgF_2$. In some other embodiments, the halide is $SrF_2$. In some additional embodiments, the halide is $CaF_2$. When oxyhalides are formed as the substrate, the oxyhalides preferred materials include $YOF$, $LaOF$, $SmOF$, $NdOF$, $EuOF$, $GdOF$, $TbOF$, $YbOF$ or mixtures thereof.

Although halides and oxyhalides have been described separately in the foregoing passages, it should be understood that the substrate of the catalyst or catalyst precursor of the current invention may comprise a mixture of halides and oxyhalides. The relative ratio of the halides and oxyhalides may vary. In some embodiments, the substrate can contain predominantly halides. In some other embodiments, the substrate contains predominantly oxyhalides. In some further embodiments, a roughly equal amount of halides and oxyhalides may present. All such variations should be considered within the scope of the current invention.

By Scanning Electron Microscope (SEM), the photodegradation catalyst or photodegradation catalyst precursor of certain embodiments of the current invention shows the plurality of the metal oxides ($V_2O_5$) is homogeneously distributed in the halides ($MgF_2$) substrate. By X-ray Diffraction (XRD) spectrum, the photodegradation catalyst or photodegradation catalyst precursor in accordance with some embodiments of the current invention contains well-crystallized metal oxide and metal halide. Some metal oxide ($V_2O_5$) and metal halide ($MgF_2$) crystals are in the tetragonal and orthorhombic configurations, respectively.

In certain embodiments, the size of the plurality of the metal oxide domains is in the range from 1 to 500 nm. In some other embodiments, the domain sizes are about 2 to 250 nm. In yet some additional embodiments, the domain sizes are about 5 to 100 nm. No significant difference in the domain size is observed between the freshly prepared catalyst or catalyst precursor and the used catalyst or catalyst precursor. The surface structure of the catalyst or catalyst precursor is also examined by using Laser Raman spectroscopy. In some embodiments, peaks of metal oxides are observed in both freshly prepared and used catalyst or catalyst precursor, suggesting that metal oxide domains exist on the surfaces of both freshly prepared and used catalyst or catalyst precursor. However, the Raman peaks of metal oxides in used catalysts or catalyst precursors are substantially weaker comparing with that of freshly prepared catalysts, suggesting that surface structure reconstruction might have occurred during photocatalysis reactions. This might also be the reason why, in some embodiments, freshly prepared catalysts or catalyst precursors require an induction time at the beginning of the photodegradation reaction.

The photodegradation catalysts or photodegradation catalyst precursors described above can be prepared by any suitable method that results in the distribution of domains of the oxide distributed within the halide or oxyhalide substrate. One particularly useful method is described below.

Thus, according to one embodiment of the current invention, a first composition containing a first metal element, a second composition containing a second metal element, and a halogenating compound are combined in the presence of a solvent. The mixture or product is then dried and calcined to produce the photodegradation catalyst or catalyst precursor of the current invention.

As used herein, the terms "first metal element" and "second metal element" carry the same meanings as described above with respect to the catalyst or catalyst precursor of the current invention.

Typically, the first metal-containing composition is a compound that is dispersible in the selected solvent. Preferably, the first metal-containing composition is at least partially soluble in the selected solvent. Some such compounds include, but are not limited to, metal nitrates, metal halides, particularly chlorides or bromides, metal salts of organic acids, sol-gels, or their mixtures. Some examples of such compositions are $NH_4VO_3$, $NbCl_5$, $Tb(NO_3)_3$ and $(NH_4)_6Mo_7O_{24} \cdot 4H_2O$. In some embodiments, $NH_4VO_3$ is preferred. In some other embodiments, $NbCl_5$ is preferred. In some further embodiments, $Tb(NO_3)_3$ is preferred. In some even further embodiments, $(NH_4)_6Mo_7O_{24} \cdot 4H_2O$ is preferred.

The second metal-containing composition can be similarly selected from suitable corresponding soluble metal salts. Some examples of such compositions are, but are not limited to, $Mg(NO_3)_2 \cdot 6H_2O$, $Sr(NO_3)_2$ and $CaCl_2$. In certain embodiments, $Mg(NO_3)_2 \cdot 6H_2O$ is preferred. In some other embodiments, $Sr(NO_3)_2$ is preferred. In some further embodiments, $CaCl_2$ is preferred.

Any material suitable for halogenating the second metal containing composition may be used. Exemplary halogenating compounds are typically halides and include, but are not limited to, hydrogen halide and alkyl ammonium compounds of the formula:

wherein $X^-$ is a halogen, preferably F, and each of $R_1$-$R_4$ is individually selected from the group consisting of hydrogen, $C_1$-$C_{20}$ linear, branched or cyclic alkyl group or a $C_6$-$C_{20}$ aryl group, and a $C_4$-$C_{20}$ linear, branched or cyclic diene. In particular embodiments, each of $R_1$-$R_4$ is hydrogen or an alkyl group, preferably having from about 1-10 carbon atoms. In some embodiments an alkyl ammonium fluoride is employed. In other embodiments, the halogenating compound is $NH_4F$. Examples of suitable hydrogen halides include HF, HCl, HBr, and HI, particularly HF.

Embodiments of the method described herein preferably include a polar solvent. Suitable polar solvents include, but are not limited to water, alcohols, ketones, phenols, ethers, esters, alkane halides, nitriles and mixtures thereof. Examples of such solvents include methanol, ethanol, propanol, acetone, ethyl acetate, propyl acetate, butyl acetate, isopropyl acetate, dimethoxy ethane, 2-methoxyethyl ether, chloroform, tetrahydrofuran, acetonitrile or mixtures thereof. In certain embodiments, water is the preferred solvent.

The first metal-containing composition, the second metal containing composition, and the halogenating compound can be combined with the solvent in any desirable order. In certain embodiments, the first metal-containing composition is dissolved or dispersed in the solvent to prepare a first solution. A second solution or dispersion comprising the second metal-containing composition and the solvent is prepared. The halogenating compound is provided as a third solution or dispersion. The first and second solutions, or portions of the first and second solutions, are then mixed together to produce an intermediate solution, into which the third solution which contains the halogenating compound is introduced. Different dissolving temperatures and mixing rates can be used depending on the characteristics of each composition/compound.

In some embodiments, the dispersions or solutions described above can be combined essentially at the same time. In some additional embodiments, the first or the second solution is mixed with the third solution to produce an intermediate solution, into which the other of the first and the second solutions is then introduced. In some further embodiments, no pre-preparation of the individual solutions is performed. Instead, powders of the starting materials may be simultaneously combined with the selected solvent. Further variations and adjustments to the above outlined dissolving and mixing procedures are also possible, depending on the specific compositions/compounds to be used in the reaction and the equipments that are available to perform these procedures.

The mixtures of the compositions/compounds are then allowed to react for a period of time. In some embodiments, the reaction can be carried out at room temperature, and about 2 to 24 hours are generally preferred in order for the ingredients to react sufficiently. Stirring or heating can be used to increase the speed of the reaction, depending on the particular compositions/compounds selected for the reaction.

Thereafter, the solvent in the reaction mixture is removed. This can be achieved by placing the reaction mixture in a container that is equipped with a vacuum and/or desiccants. Alternatively, the solvent may be removed by applying heat to the mixture. For example, when water is used as the solvent, the reaction mixture can be dried at a temperature between 50° C. to 200° C. More preferably, the water solvent can be removed by heating the reaction mixture at 120° C. In some embodiments, 10 hours of heating and drying at 120° C. is sufficient for complete removal of water from the reaction mixture.

The dried intermediate composition is then calcined. The temperature used to calcine the dried intermediate composition can vary depending on the first metal and the second metal that are chosen for the reaction. In some embodiments, calcination is performed at a temperature of between 200° C. to 1200° C., preferably around 450° C. In some other embodiments, lower calcination temperatures are preferred. Thus, some preferred embodiments calcine the dried intermediate mixture at a temperature preferably in the range of about 200° C. to about 450° C. The duration of the calcination may vary depending on the temperature used for the calcination. In some embodiments, about 5 hours of calcination at a temperature of about 450° C. is sufficient to produce the photodegradation catalyst or photodegradation catalyst precursor of the current invention.

To further improve the photodegradation efficiency of the catalyst or catalyst precursor, a third metal element can be optionally added into the catalyst or catalyst precursor. The third metal is preferably a transition metal. Examples include, but are not limited to, Ru, Rh, Pd, Ir, Pt. Mixtures of such metals can also be used. In some embodiments, the third metal element is Pt.

In certain embodiments, the third metal element is introduced into the catalyst or catalyst precursor by preparing a solution of a soluble compound of the third metal element, immersing the catalyst or catalyst precursor prepared above into the solution, followed by drying the solution to obtain the final catalyst/catalyst precursor. In some other embodiments, the third metal element is added into the catalyst or catalyst precursor by introducing a composition containing the third metal element into the initial reaction mixture of the first metal composition, the second metal composition, and the halogenating compound. The reaction mixture is then dried and calcined according to the same procedures as described above. Other "doping" methods available in the art can also be used to introduce the third metal element into the catalyst or catalyst precursor.

One utility of the photodegradation catalyst or photodegradation catalyst precursor of the current invention is to degrade organic pollutants or substances. This can be usually achieved by bringing the photodegradation catalyst or catalyst precursor of the current invention into contact with organic pollutants or substances in the presence of oxygen and light. Any suitable source for providing the desired wavelength of light may be used. The reaction can occur either in air or in water, depending on the particular circumstance of the application.

The following examples are provided to further illustrate the invention. They represent specific embodiments of the current invention and should not be interpreted or construed as limitations to the scope of the invention.

Example 1

Photodegradation Reaction

After the preparation of each catalyst or catalyst precursor in the following Examples, photodegradation reactions were carried out to test the potencies of the catalyst or catalyst precursor. Generally, the catalytic reactions were carried out in a Pyrex glass tube, wherein light with wavelength λ>320 nm can pass the glass. The reactor tube had an inner diameter (ID) of 9.0 mm and an outer diameter (OD) of 14 mm. Except specifically described in the Examples, pure oxygen or air was used as an oxidant. The flow of oxygen or air was about 5.0 ml/min. In each reaction, 5.0 g of the catalyst or catalyst precursor was used. Two 500 W high-pressure mercury lamps were used as light sources and optical filters were placed in front of the mercury lamps to cut off the unneeded light with certain wavelengths. The organic reactants introduced individually in the reactions were acetone, methanol, ethanol, and/or benzene. The concentrations of acetone, methanol, ethanol, and benzene in oxygen were 10.0%. 11.8%, 4.2%, and 5.9%, respectively. The cut off optical filters used in different reactions were with wavelengths of λ>320 nm (Pyrex glass tube cut-off wavelength), λ>380 nm, λ>520 nm, or λ>560 nm, as specified in each Example.

Example 2

41.36 g of $Mg(NO_3)_2 \cdot 6H_2O$ was dissolved into 100 ml of $H_2O$ to obtain solution A. 9.43 g of $NH_4VO_3$ was dissolved in 1000 ml of $H_2O$ to obtain solution B. 11.94 g of $NH_4F$ was dissolved into 100 ml of $H_2O$ to obtain solution C. All of solution A was mixed with 200 ml of solution B, and then mixed with all of the solution C to obtain a mixture under stirring. The mixture was kept at room temperature for 12 hours. The mixture was dried at 120° C. for 10 hours, calcined at 450° C. for 5 hours, and then cooled to room temperature to obtain a catalyst or catalyst precursor of 9.09% $V/MgF_2$, wherein 9.09% represents the relative mole percentage of V atoms in the total mole of the first metal (V) and second metal (Mg) calculated from the amounts of the starting materials used in the reaction.

The catalyst or catalyst precursor was then tested for photodegradation activities under reaction conditions as described above. Acetone, methanol, ethanol, and benzene were used as organic reactants. When an optical filter with λ>380 nm was used, the oxidation conversions for acetone, methanol, ethanol, and benzene were 97.0%, 99.3%, 98.8%, 26.0%, respectively. When an optical filter with λ>520 nm was used, the oxidation conversion for acetone is 20.0%. Details of the reaction results are listed in Table 1.

Figure 1:
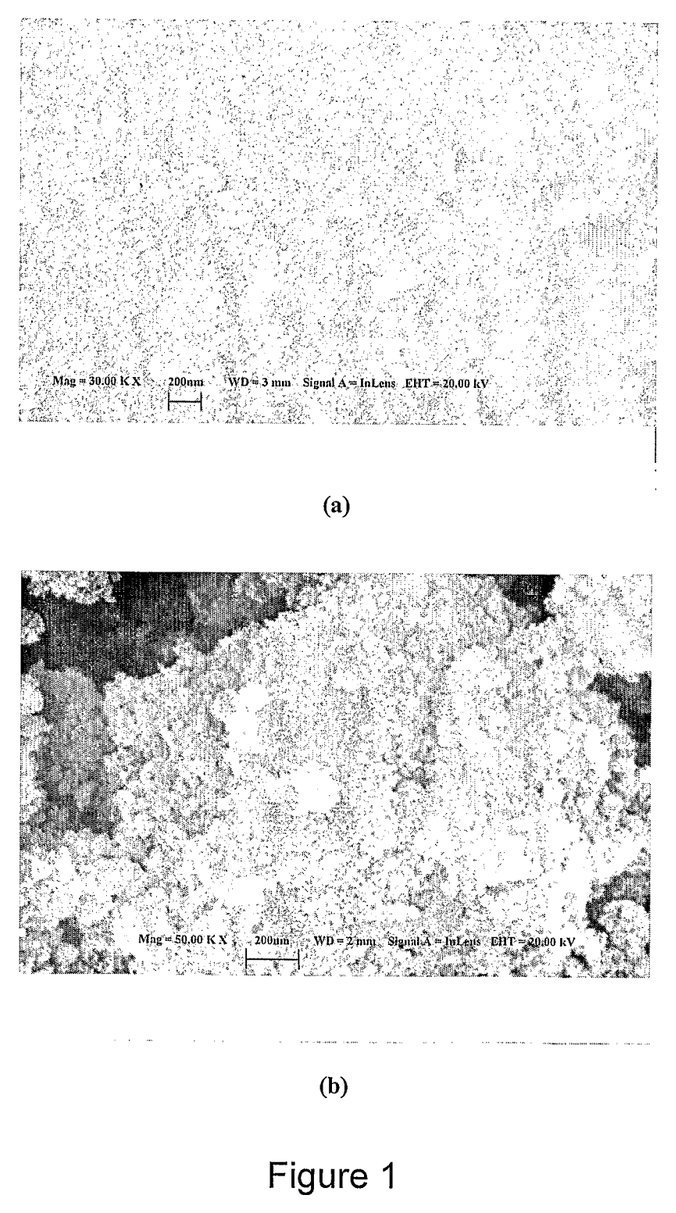
FIG. 1 illustrates images from the Scanning Electron Microscope (SEM) for 9.09% $V_2O_5/MgF_2$ (a) and $MgF_2$ (b), respectively, according to one embodiment of the invention.

The catalyst or catalyst precursor was then examined under Scanning Electron Microscope (SEM), X-ray Diffraction (XRD) spectrum, and Laser Raman spectrum according to established protocols commonly used in the art. As shown in FIG. 1, the catalyst or catalyst precursor of 9.09% $V/MgF_2$ (picture a) as prepared had a particle size distribution between about 10 and about 20 nm, which was relatively smaller than that of $MgF_2$ alone (picture b). The XRD pattern for the catalyst or catalyst precursor was obtained using a Philips PW3040/60 automatic X-ray diffraction meter (Cu Kα radiation, voltage 40 kV, current 40 mA) with a scan step 0.08° $(2\theta)S^{-1}$ at a static air environment. The morphology and particle size information of catalyst or catalyst precursor catalyst were observed with a LEO-1530 field emission Scanning Electron Microscope (SEM). The Laser Raman spectrum of catalyst or catalyst precursor catalyst was measured using Renishaw RM1000 Raman spectrometer with a 514.4 nm laser excitation wavelength and the acquisition of spectra from 100 to 4000 $cm^{-1}$.

TABLE 1

Reaction results at λ > 380 nm and oxygen flow of 5.0 ml/min over 9.09% $V/MgF_2$ (mole %).

| Organic Compounds | Acetone | Methanol | Ethanol | Benzene |
|---|---|---|---|---|
| Concentration of Organic Compound (%) | 10 | 11.8 | 4.2 | 5.9 |
| Conversion (%) | 97.0 | 99.3 | 98.8 | 26.0 |
| CO Selectivity (%) | 16.3 | 22.6 | 25.1 | 42.8 |
| $CO_2$ Selectivity (%) | 80.7 | 31.3 | 45.5 | 57.2 |
| Selectivity of Other Compounds (%) | 3.0 (acetol) | 46.1 (formaldehyde) | 29.4 (acetaldehyde) | — |

\* —: Indicates not present.

Figure 2:
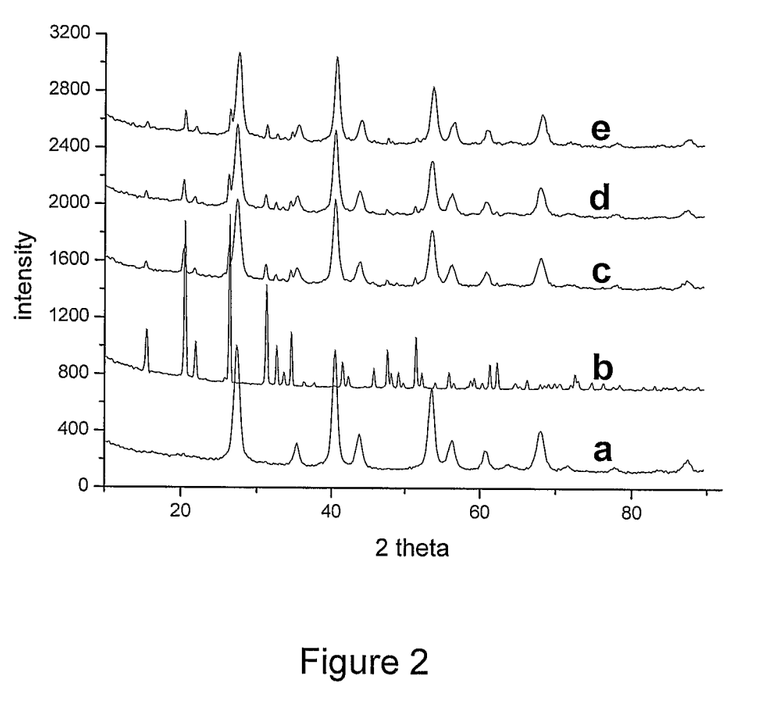
FIG. 2 is a diagram showing the X-ray Diffraction (XRD) spectra for: a) $MgF_2$, b) $V_2O_5$, c) freshly produced 9.09% $V/MgF_2$, d) used 9.09% $V/MgF_2$, and e) freshly produced 0.11% $Pt/9.09\%$ $V/MgF_2$, respectively, according to another embodiment of the invention.

In FIG. 2, XRD analysis indicated that the catalyst or catalyst precursor of 9.09% $V/MgF_2$ contained both well-crystallized $V_2O_5$ (tetragonal) and $MgF_2$ (orthorhombic) phases. No significant difference was observed between the freshly prepared catalyst/catalyst precursor of 9.09% $V/MgF_2$ (spectrum c) and used catalyst/catalyst precursor of 9.09% $V/MgF_2$ (spectrum d). Both XRD spectra and SEM pictures seemed to suggest that $V_2O_5$ domains were dispersed in the $MgF_2$ substrate.

Figure 3:
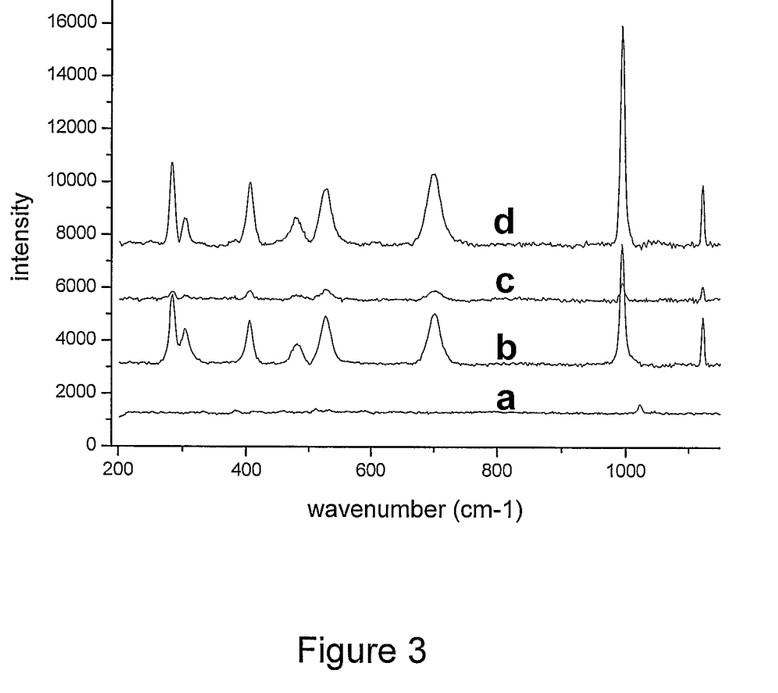
FIG. 3 is a diagram illustrating the Laser Raman spectra for: a) $MgF_2$, b) freshly produced 9.09% $V/MgF_2$, c) used 9.09% $V/MgF_2$, and d) $V_2O_5$, respectively, according to a further embodiment of the invention.

FIG. 3 shows the Laser Raman spectra for: a) $MgF_2$, b) freshly produced 9.09% $V/MgF_2$, c) used 9.09% $V/MgF_2$, and d) $V_2O_5$, respectively. $V_2O_5$ peaks were observed in both freshly prepared and used 9.09% $V/MgF_2$ catalyst/catalyst precursor, suggesting that $V_2O_5$ domains existed on the surfaces of both freshly prepared and used 9.09% $V/MgF_2$ catalyst/catalyst precursor. On the other hand, weaker Raman peaks of $V_2O_5$ were observed in used 9.09% $V/MgF_2$ catalyst/catalyst precursor, suggesting surface structure reconstruction might have occurred during the photocatalysis reaction. This might also be the reason that 9.09% V/MgF$_2$ showed an induction time of about 3 hours at the beginning of the photodegradation reaction, although the current invention should not be bound by any particular theories stipulated herein.

Example 3

41.36 g of Mg(NO$_3$)$_2$.6H$_2$O was dissolved into 100 ml of H$_2$O to obtain solution A. 9.43 g of NH$_4$VO$_3$ was dissolved in 1000 ml of H$_2$O to obtain solution B. 11.94 g of NH$_4$F was dissolved into 100 ml of H$_2$O to obtain solution C. All of solution A was mixed with 200 ml of solution B, and then mixed with all of the solution C to obtain a mixture under stirring. The mixture was kept at room temperature for 12 hours. The mixture was dried at 120° C. for 10 hours, and then calcined at 450° C. for 5 hours, and cooled to room temperature to obtain a catalyst/catalyst precursor.

10.0 g of the catalyst/catalyst precursor was added into 20 ml of H$_2$PtCl$_6$.6H$_2$O solution (0.0029 M). The sample was kept at room temperature for 6 hours, and then dried at 120° C. for 4 hours to obtain a catalyst/catalyst precursor with 0.11% Pt (mass %) in 9.09% V/MgF$_2$ (mole %).

The catalyst/catalyst precursor was tested for photodegradation activities in reactions as described above. Acetone, methanol, ethanol, and benzene were used as organic reactants. Details of the reaction results are listed in Table 2.

When an optical filter with λ>560 nm was used, the oxidation conversion for acetone was 53.6%. When a catalyst/catalyst precursor was prepared by the same method, but the Pt loading was increased to 0.40% (i.e. 0.40% Pt (mass %) in 9.09% V/MgF$_2$ (mole %)) and when an optical filter with λ>560 nm was used, the oxidation conversion for acetone was 99.2%.

TABLE 2

Reaction results at λ > 380 nm and oxygen flow of 5.0 ml/min over 9.09% V/MgF$_2$ (mole %) containing 0.11% Pt (mass %).

| Organic compound | Acetone | Methanol | Ethanol | Benzene |
|---|---|---|---|---|
| Concentration of Organic Compound (%) | 10 | 11.8 | 4.2 | 5.9 |
| Conversion (%) | 97.5 | 100 | 100 | 25.6 |
| CO Selectivity (%) | 0 | 0 | 0 | 0 |
| CO$_2$ Selectivity (%) | 98.4 | 99.8 | 96.7 | 100 |
| Selectivity of Other Compounds (%) | 1.6 (acetol) | 0.2 (CH$_2$O) | 3.3 (CH$_3$CHO) | — |

*—: Indicates not present.

When air (5.0 ml/min) containing 2.4% acetone was passed into the reactor loaded with 0.11% Pt (mass %) in 9.09% V/MgF$_2$ (mole %) catalyst/catalyst precursor and an optical filter with cut off wavelength λ>380 nm was used, the acetone degradation conversion was 99.3%. All of the products were CO$_2$ and H$_2$O.

Example 4

41.36 g of Mg(NO$_3$)$_2$.6H$_2$O was dissolved into 100 ml of H$_2$O to obtain solution A. 4.36 g of NbCl$_5$ was dissolved in 100 ml of oxalic acid aqueous solution (0.10 M) to obtain solution B. 11.94 g of NH$_4$F was dissolved into 100 ml of H$_2$O to obtain solution C. Solution A was mixed with solution B, and then mixed with solution C to obtain a mixture under stirring. The mixture was kept at room temperature for 12 hours. The mixture was dried at 120° C. for 10 hours, and then calcined at 450° C. for 5 hours, and cooled to room temperature to obtain a catalyst/catalyst precursor.

The catalyst/catalyst precursor was tested for photodegradation activities for acetone at the same conditions as described above. When there was no optical filter and the Pyrex glass tube itself has a cut off wavelength of λ>320 nm, the oxidation conversions for acetone was 53.0%.

Example 5

41.36 g of Mg(NO$_3$)$_2$.6H$_2$O was dissolved into 100 ml of H$_2$O to obtain solution A. 5.56 g of Tb(NO$_3$)$_3$ was dissolved in 100 ml of H$_2$O to obtain solution B. 11.94 g of NH$_4$F was dissolved into 100 ml of H$_2$O to obtain solution C. Solution A was mixed with solution B, and then mixed with solution C to obtain a mixture under stirring. The mixture was kept at room temperature for 12 hours. The mixture was dried at 120° C. for 10 hours, and then calcined at 450° C. for 5 hours, and cooled to room temperature to obtain a catalyst/catalyst precursor. The catalyst/catalyst precursor was tested for photodegradation activities for acetone at the same conditions as described above. When there was no optical filter and the Pyrex glass tube itself has a cut off wavelength of λ>320 nm, the oxidation conversions for acetone was 53.8%.

Example 6

16.85 g of Sr(NO$_3$)$_2$ was dissolved into 100 ml of H$_2$O to obtain solution A. 9.43 g of NH$_4$VO$_3$ was dissolved in 1000 ml of H$_2$O to obtain solution B. 11.78 g of NH$_4$F was dissolved into 100 ml of H$_2$O to obtain solution C. All of solution A was mixed with 200 ml of solution B, and then mixed with all of the solution C to obtain a mixture under stirring. The mixture was kept at room temperature for 12 hours. The mixture was dried at 120° C. for 10 hours, and then calcined at 450° C. for 5 hours, and cooled to room temperature to obtain a catalyst/catalyst precursor of 9.09% V/SrF$_2$ (mole %). The catalyst/catalyst precursor was tested for photodegradation activities for acetone at the same conditions as described above. When there was no optical filter and the Pyrex glass tube itself has a cut off wavelength of λ>320 nm, the oxidation conversions for acetone was 57.0%. When an optical filter with cut off wavelength λ>380 mm was used, the acetone degradation conversion was 9.4%.

Example 7

33.69 g of Sr(NO$_3$)$_2$ was dissolved into 100 ml of H$_2$O to obtain solution A. 7.87 g of (NH$_4$)$_6$Mo$_7$O$_{24}$.4H$_2$O was dissolved in 100 ml of H$_2$O to obtain solution B. 11.78 g of NH$_4$F was dissolved into 100 ml of H$_2$O to obtain solution C. Solution A was mixed with solution B, and then mixed with solution C to obtain a mixture under stirring. The mixture was kept at room temperature for 12 hours. The mixture was dried at 120° C. for 10 hours, and then calcined at 450° C. for 5 hours, and cooled to room temperature to obtain a catalyst/catalyst precursor. The catalyst/catalyst precursor was tested for photodegradation activities for acetone at the same conditions as described above. When there was no optical filter and the Pyrex glass tube itself has a cut off wavelength of λ>320 nm, the oxidation conversions for acetone was 58.3%.

Example 8

14.23 g CaCl$_2$ was dissolved into 100 ml of H$_2$O to obtain solution A. 9.43 g of NH$_4$VO$_3$ was dissolved in 1000 ml of H$_2$O to obtain solution B. 18.97 g of NH$_4$F was dissolved into 100 ml of $H_2O$ to obtain solution C. All of Solution A was mixed with 200 ml of solution B, and then mixed with all of the solution C to obtain a mixture under stirring. The mixture was kept at room temperature for 12 hours. The mixture was dried at 120° C. for 10 hours, and then calcined at 450° C. for 5 hours, and cooled to room temperature to obtain a catalyst/catalyst precursor of 9.09% V/$CaF_2$ (mole %). The catalyst/catalyst precursor was tested for photodegradation activities for acetone at the same conditions as described in reaction condition section. When there was no optical filter and the Pyrex glass tube itself has a cut off wavelength of $\lambda$>320 nm, the oxidation conversions for acetone was 49.8%.

Although not to be bound by any particular theory, it is believed that the halide or oxyhalide substrate formed in the current invention possess big band gaps, and therefore are relatively inert in the finally produced catalyst or catalyst precursor. Consequently, the halide or oxyhalide substrate functions as a buffering medium to retard the recombination of the electron-hole pairs of the metal oxides domains distributed within and on the surface of the halide or oxyhalide substrate. Therefore, catalysts or catalyst precursors produced in the current invention possess potent photodegradation activities with well-controlled electron-hole pair recombination.

While the invention has been described with a limited number of embodiments, these specific embodiments are not intended to limit the scope of the invention as otherwise described and claimed herein. Variations and modifications therefrom exist. Any number disclosed herein should be construed to mean approximate, regardless of whether the word "about" or "approximate" is used in describing the number. The appended claims intend to cover all such variations and modifications as falling within the scope of the invention.

The invention claimed is:

1. A photodegradation catalyst or a photodegradation catalyst precursor comprising a plurality of domains of an oxide of a first metal distributed in a substrate of a halide or oxyhalide of a second metal, wherein the mole percentage of the halide or oxyhalide of the second metal is above 50%.

2. The photodegradation catalyst or the photodegradation catalyst precursor of claim 1, wherein the mole percentage of the halide or oxyhalide is from about 70% to about 95%.

3. The photodegradation catalyst or the photodegradation catalyst precursor of claim 2, wherein the mole percentage of the halide or oxyhalide is about 90%.

4. The photodegradation catalyst or the photodegradation catalyst precursor of claim 1, wherein the plurality of domains of the oxide of the first metal have a size ranging from 1 to 500 nm.

5. The photodegradation catalyst or the photodegradation catalyst precursor of claim 4, wherein the plurality of domains of the oxide of the first metal have a size ranging from 2 to 250 nm.

6. The photodegradation catalyst or the photodegradation catalyst precursor of claim 5, wherein the plurality of domains of the oxide of the first metal have a size ranging from 5 to 100 nm.

7. The photodegradation catalyst or the photodegradation catalyst precursor of claim 1, wherein the halide or oxyhalide is fluoride or oxyfluoride, respectively.

8. The photodegradation catalyst or the photodegradation catalyst precursor of claim 7, wherein the halide of the second metal comprises $NaF$, $MgF_2$, $CaF_2$, $SrF_2$, $BaF_2$ or mixtures thereof.

9. The photodegradation catalyst or the photodegradation catalyst precursor of claim 7, wherein the oxyhalide of the second metal comprises $YOF$, $LaOF$, $SmOF$, $NdOF$, $EuOF$, $GdOF$, $TbOF$, $YbOF$ or mixtures thereof.

10. The photodegradation catalyst or the photodegradation catalyst precursor of claim 1, wherein the oxide of the first metal comprises $TiO_2$, $ZrO_2$, $V_2O_5$, $Nb_2O_5$, $Ta_2O_5$, $Cr_2O_3$, $MoO_3$, $WO_3$, $MnO_2$, $Fe_2O_3$, $RuO_2$, $Ru_2O_3$, $RuO$, $Re_2O_7$, $CO_2O_3$, $NiO$, $ZnO$, $CdO$, $Ga_2O_3$, $In_2O_3$, $Tl_2O_3$, $SnO_2$, $Sb_2O_3$, $TeO_3$, $TeO_2$, $Y_2O_3$, $La_2O_3$, $Sm_2O_3$, $CeO_2$, $TbO$, $TbO_2$, $Eu_2O_3$, $NdO$, $NdO_2$, $GdO$, $GdO_2$ or mixtures thereof.

11. The photodegradation catalyst or the photodegradation catalyst precursor of claim 10, wherein the oxide of the first metal comprises $TiO_2$, $V_2O_5$, $Nb_2O_5$, $TbO_2$, $TbO_2$, $MoO_3$ or mixtures thereof.

12. A method of preparing a photodegradation catalyst or a photodegradation catalyst precursor,
wherein the photodegradation catalyst or the photodegradation catalyst precursor comprises a plurality of domains of an oxide of a first metal distributed in a substrate of a halide or oxyhalide of a second metal, and
wherein the mole percentage of the halide or oxyhalide of the second metal is above 50%,
the method comprising:
  a. combining a first metal-containing composition, a second metal-containing composition, and a halogenating compound in the presence of a solvent to provide an intermediate composition,
  wherein the first metal-containing composition comprises a first metal element;
  wherein the second metal-containing composition comprises a second metal element;
  wherein the mole percentage of the second metal element in the total amount of the first and second metal elements is at least 50%, and
  wherein at least one of the first- or second-metal containing compositions is a metal oxide, a salt of a metal oxide, or a metal containing salt;
  b. removing the solvent from the intermediate composition to provide a dried intermediate composition;
  c. calcining the dried intermediate composition to produce the photodegradation catalyst or the photodegradation catalyst precursor.

13. The method of claim 12, wherein the photodegradation catalyst or the photodegradation catalyst precursor comprises regions of metal oxide containing the first metal element that are dispersed within a metal halide or a metal oxyhalide of the second metal element.

14. The method of claim 12, wherein the first metal element is selected from the group consisting of Ti, Zr, V, Nb, Ta, Cr, Mo, W, Mn, Fe, Ru, Re, Co, Ni, Zn, Cd, Ga, In, Tl, Sn, Sb, Bi, Te, Y, La, Sm, Ce, Tb, Eu, Nd, Gd and mixtures thereof.

15. The method of claim 14, wherein the first metal element is selected from the group consisting of Ti, V, Nb, Tb, Mo and mixtures thereof.

16. The method of claim 12, wherein the second metal element included in the second metal-containing composition is selected from the group consisting of Group 1A metals, Group 2A metals, Sc, Y, La, Sm, Nd, Eu, Gd, Tb, Yb and mixtures thereof.

17. The method of claim 16, wherein the second metal element is selected from Group 1A and Group 2A metals consisting of Na, Mg, Ca, Sr, Ba and mixtures thereof.

18. The method of claim 12, wherein the halogenating compound is a compound of the formula: $(R_1R_2R_3R_4)N+X-$ wherein X is a halogen and each of $R_1$, $R_2$, $R_3$, and $R_4$ is individually selected from the group consisting of hydrogen, $C_1$-$C_{20}$ linear, branched or cyclic alkyl group or a $C_6$-$C_{20}$ aryl group, and a $C_4$-$C_{20}$ linear, branched or cyclic diene.

19. The method of claim 12, wherein the halogenating compound comprises an alkyl ammonium fluoride or HF.

20. The method of claim 12, wherein the calcining is conducted at a temperature between about 200° C. to about 1200° C.

21. The method of claim 20, wherein the calcining is performed at a temperature of about 450° C.

22. The method of claim 12, further comprising a step of doping the photodegradation catalyst or the photodegradation catalyst precursor with a third metal element.

23. The method of claim 22, wherein the doping comprises: providing a third metal-containing composition prior to removing the solvent.

24. The method of claim 23, wherein the third metal element of the third metal-containing composition is selected from the group consisting of Ru, Rh, Pd, Ir, Pt and mixtures thereof.

25. The method of claim 24, wherein the third metal element is Pt.

26. The method of claim 12, wherein the solvent is a polar solvent selected from the group consisting of water, alcohols, ketones, phenols, ethers, esters, alkane halides, nitriles and mixtures thereof.

27. The method of claim 26, wherein the polar solvent is selected from the group consisting of methanol, ethanol, propanol, acetone, ethyl acetate, propyl acetate, butyl acetate, isopropyl acetate, dimethoxy ethane, 2-methoxyethyl ether, chloroform, tetrahydrofuran, acetonitrile and mixtures thereof.

28. The method of claim 26, wherein the polar solvent comprises water.

29. A method of photodegradating organic pollutants, comprising:

i) preparing a photodegradation catalyst or a photodegradation catalyst precursor,
   wherein the photodegredation catalyst or the photodegredation catalyst precursor comprises a plurality of domains of an oxide of a first metal distributed in a substrate of a halide or oxyhalide of a second metal, and
   wherein the mole percentage of the halide or oxyhalide of the second metal is above 50%, by:
   a. combining a first metal-containing composition, a second metal-containing composition, and a halogenating compound in the presence of a solvent to provide an intermediate composition,
      wherein the first metal-containing composition comprises a first metal element;
      wherein the second metal-containing composition comprises a second metal element;
      wherein the mole percentage of the second metal element in the total amount of the first and second metal elements is at least 50%, and
      wherein at least one of the first- or second-metal containing compositions is a metal oxide, a salt of a metal oxide, or a metal containing salt;
   b. removing the solvent from the intermediate composition to provide a dried intermediate composition;
   c. calcining the dried intermediate composition to produce the photodegradation catalyst or the photodegradation catalyst precursor;
ii) contacting the photodegradation catalyst or the photodegradation catalyst precursor with one or more organic pollutants in the presence of oxygen and light to form a photodegraded product.

* * * * *